United States Patent [19]

Lizzi

[11] Patent Number: 5,519,824
[45] Date of Patent: May 21, 1996

[54] SYSTEM AND METHOD FOR STORING AND DISPLAYING FONT DATA REPRESENTING FIXED-WIDTH AND COMPRESSED CHARACTERS

[75] Inventor: Ronald S. Lizzi, West Hartford, Conn.

[73] Assignee: Timex Corporation, Middlebury, Conn.

[21] Appl. No.: 214,504

[22] Filed: Mar. 18, 1994

[51] Int. Cl.$^6$ .................................................. G06T 11/00
[52] U.S. Cl. ........................... 395/150; 395/151; 368/69; 368/224; 345/26; 345/128; 345/143; 345/195
[58] Field of Search ...................................... 395/110, 150, 395/151; 345/26–28, 33–39, 55, 127–130, 141, 143, 189–195, 202, 200; 368/29–30, 69–73, 82–84, 223, 241–242

[56] References Cited

U.S. PATENT DOCUMENTS

| | | | |
|---|---|---|---|
| 3,623,068 | 11/1971 | Horgan et al. | 340/324 A |
| 4,432,096 | 7/1982 | McDevitt | 364/900 |
| 4,901,248 | 2/1990 | Ueno et al. | 364/519 |
| 4,942,390 | 7/1990 | Do et al. | 395/114 |
| 5,050,121 | 9/1991 | Vaughan | 395/150 |
| 5,404,436 | 4/1995 | Hamilton | 395/150 |
| 5,410,520 | 4/1995 | Stampfer | 368/240 |

*Primary Examiner*—Heather R. Herndon
*Assistant Examiner*—Joseph H. Feild
*Attorney, Agent, or Firm*—William C. Crutcher

[57] ABSTRACT

A system and method for storing and retrieving fixed-width and compressed characters of at least one font, which includes memory having a plurality of memory addresses for storing instructions and encoded character font data representing fixed-width and compressed characters, wherein the encoded character font data for a fixed-width character of any given font is identical to the encoded character font data for a compressed character for the same font. The system addresses the plurality of memory addresses so as to read out the encoded character font data and then, depending upon the value of a control signal generated by the system's control unit, decodes the encoded character font data through a decoder as either a fixed-width or compressed character. The fixed-width or compressed character is then displayed on a dot-matrix display. Each memory address commonly contains a plurality of bits which represents a column of said character. A first subset of the bits may then be set or not set in accordance with the particular shape and form of that particular columnar portion of the character. A second subset of bits are then set or not set to indicate which column(s) may be ignored for generation of the compressed characters. The instant invention thus achieves both storage simplicity and display efficiency, by providing a system which can store character font data for both the fixed-width and compressed characters of any given font using the same memory addresses, but which can display those characters of that font using only the minimum amount of columns necessary to accurately represent same.

10 Claims, 7 Drawing Sheets

|      | 3001 | 3002 | 3003 | 3004 | 3005 |
|------|------|------|------|------|------|
|      | X | X | X | X | X |
|      | X | X | X | X | X |
|      | X | X | X | X | X |
|      | 1 | 0 | 0 | 0 | 1 |
|      | 1 | 1 | 0 | 1 | 1 |
|      | 1 | 0 | 1 | 0 | 1 |
|      | 1 | 0 | 0 | 0 | 1 |
|      | 1 | 0 | 0 | 0 | 1 |

SYSTEM AND METHOD FOR STORING AND DISPLAYING FONT DATA REPRESENTING FIXED-WIDTH AND COMPRESSED CHARACTERS

BACKGROUND OF THE INVENTION

The field of the invention is computing devices which store and retrieve character font data and which display same on dot-matrix displays. More specifically, this invention relates to a system and method for storing and displaying data which represents both fixed-width and compressed characters in computing devices having semiconductor memories and further having dot-matrix displays for displaying said characters.

1. Definitions

The term "character" herein is used to designate any letter, number, punctuation mark, or special character or symbol which can be produced on a display.

The term "font" herein is used to designate a complete collection of letters, punctuation marks, numbers, and special characters with a consistent and identifiable typeface, weight, posture (e.g., upright or italic) and size.

The term "fixed-width character" or "fixed-width format" is used herein to designate a character represented by a fixed or uniform number of columns of display "dots", irrespective of the particular nature or shape of said character.

The term "compressed character", "proportionally-spaced character", or "compressed format" is used herein to designate a character which may be represented by a variable number of columns of display "dots", depending upon the particular nature and shape of said character.

2. Background

Computing devices which retrieve serially stored data and display the characters represented by such data on dot matrix displays, are well known in the art. In such devices, data representing a particular portion of a subject character is stored in a distinct memory location or address within the device's semiconductor memory. As data is generally stored in such memory in the form of bytes, each memory address commonly contains one byte of information which represents a columnar portion of said character. The eight bits of said byte may then be set or not set in accordance with the particular shape and form of that particular columnar portion of the character; that is, each bit will be set to a digital 1 or 0 to indicate whether that particular "dot" of the dot matrix display which is associated with that particular bit will be activated, or turned "on".

Figure 1A:
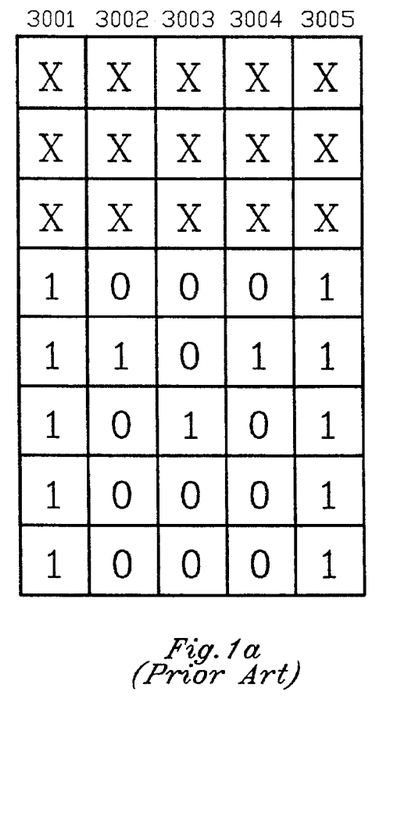
FIGS. 1a, 1b show the storage in memory of the encoded character font data representing an alphanumeric character and the display of said alphanumeric character on a dot matrix display.
Figure 1B:
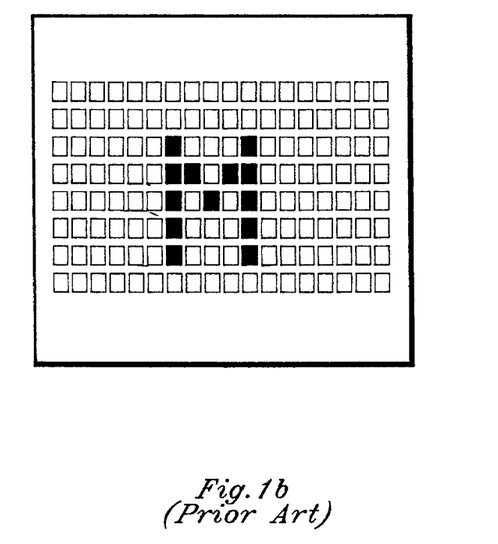

One form of memory storage and display known in the art is shown in FIGS. 1a and 1b. Specifically, FIGS. 1a and 1b respectively show the letter "M" as stored as character font data in a semiconductor or similar memory, and as displayed on a dot matrix display. It will be appreciated that due to the presence of two diagonal lines in the letter "M", proper display of same requires at least five columns of the dot matrix display. Again, since each memory address generally contains one columnar portion of a character, five memory addresses (e.g., addresses 3001–3005 in FIG. 1a) are therefore also required, with, for example, memory address 3001 containing the information representing the leftmost columnar portion of the letter "M". As the last five bits of memory address 3001 are each set to "1", each dot of the dot matrix display will be activated or illuminated. (It will be seen from FIG. 1a that each of the first three bits of each byte is set to "X", to represent a "don't care" state. In accordance with the present invention, as set forth in the following discussion, these bits serve as flag bits which may be set or not set depending upon the width of the character to be displayed. However, for purposes of representation of a character or symbol on a display, these bits are ignored.)

As discussed above, at least five columns of a dot matrix display are required to accurately and properly represent the letter "M". In fact, all alphanumeric characters, and many symbols, may be displayed on a dot matrix display using five columns and five rows of a dot matrix display; that is, using a 5×5 dot matrix. However, it will be understood that some characters of any given font do not require as many as five columns in order to be fully and accurately represented. Thus, for example while the letter "M" requires five columns to be fully and accurately conveyed, the letter "H" could be completely displayed using only three columns. As display space is often limited (as is the case with timepiece displays), it would be desirable to display characters using the minimum amount of columns necessary to accurately represent each character or symbol; i.e., by using proportional-spacing or character compression. Furthermore, not only would such compressed characters require less display space, but, as importantly, the encoded data which represents such characters would also require a fewer number of memory addresses and thus less memory, which, as with display space, is also often at a premium, especially in smaller devices such as timepieces.

For purposes of simplicity of storage and retrieval memory, however, it is usually desirable to store character data using a uniform number of columns, and therefore memory addresses, to represent each character or symbol of any given character. Again, since some characters require at least five columns for complete representation, a uniform format would mandate that aft characters be represented by five columns, or five memory address locations. In such a system, these characters would all have a fixed or uniform "address width" (i.e., number of address locations), irrespective of the particular "address width" needed to represent any particular character, and any resulting display of that character on a display would also be of a uniform or fixed width. Thus, looking to the example above, the letter "H" would be represented by five columns of data, even though only three columns of display would be required.

Additionally, at certain times, legibility of the displayed characters and simplicity of editing messages comprising said displayed characters are paramount and therefore fixed-width characters would be more desirable. Specifically, given the greater average size of fixed-width characters, displayed messages using same would be more legible. Further, the vertical alignment of letters of corresponding columns in different lines which would result from using fixed-width characters may be desirable in certain instances.

Perhaps less obviously, fixed width characters allow simplified editing control. For example: if the user changed a displayed message from "MAP" to "TAP" using compressed-width characters, the computing device would be required to "shift" the "AP" portion to the left on the display, in order to compensate for the change in columnar width of the first letter (i.e., from five columns for the letter "M" to three columns for the letter "T"). As use of fixed-width characters requires the same number of display columns, such compensation is not required; therefore message display editing is simplified.

It would be desirable therefore to capitalize on both the storage simplicity of the fixed-width character font data and the display efficiency of the compressed-character font data, by providing a system which could store fixed-width character font data for each character but which could display the characters represented by such data using only the minimum amount of columns necessary to accurately represent same. While one solution would be to store separate data arrays for the fixed-width and compressed characters, this is an inefficient use of valuable memory space.

Therefore, it is an object of the present invention to provide a simple and efficient system and method of storing information and displaying same on a dot matrix display.

Another object of the present invention is to provide a system and method which will maximize the amount of information which may be displayed on a dot matrix display.

An additional object of the present invention is to provide a system and method which will maximize the amount of information which may be displayed on a dot matrix display yet will allow for simple storage of same.

Yet another object of the present invention is to provide a system and method of storing uniform character font data in a computer memory and displaying said data as fixed-width or compressed sized characters on a dot matrix display.

Still another object of the invention is to provide a system which simultaneously defines fixed-width and compressed characters where the compressed characters are selectively compressed versions of the fixed-width characters.

A further object of the present invention to provide a simple and efficient system and method of storing both fixed-width and compressed characters for a dot matrix display, such that the data for each character in both characters uses the same memory locations or addresses.

SUMMARY OF THE INVENTION

Briefly stated, the present invention concerns a system and method for storing, retrieving and displaying a character, where the character is to be displayed in either a compressed character display format or a fixed-width character display format, which comprises memory means for storing the character as an encoded font data, the encoded font data comprising a plurality of bytes; each byte of the encoded font data comprising a first set and a second set where each set comprises at least one bit, the collective first sets for the plurality of bytes representing both a fixed-width character and a compressed character, and the second set indicating whether the corresponding first set of the byte should be displayed when the system is in the compressed character display format; and means responsive to a control signal for causing the character to be displayed on a display, a first value for the control signal causing the character to be displayed in the fixed-width character display format and a second value for the control signal causing the character to be displayed in the compressed character display format.

The instant invention thus achieves both storage efficiency and simplicity, as well as display efficiency, by providing a system which can store character font data for both the fixed-width and compressed characters of any given font using the same memory addresses.

DETAILED DESCRIPTION OF THE PREFERRED EMBODIMENT

A preferred embodiment of the present invention is set forth with reference to FIGS. 1 through 8.

Figure 2:
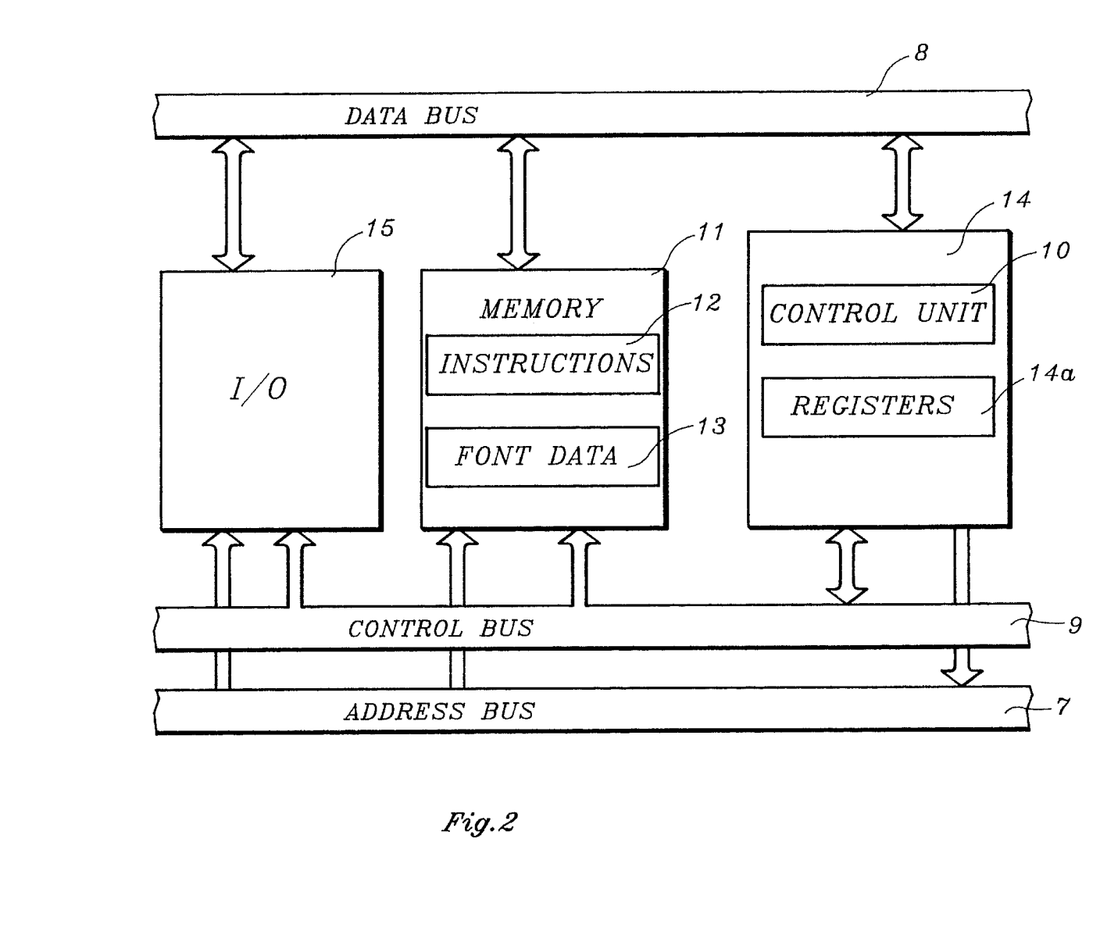
FIG. 2 is a block diagram of the preferred embodiment of the system of the invention.
Figure 3:
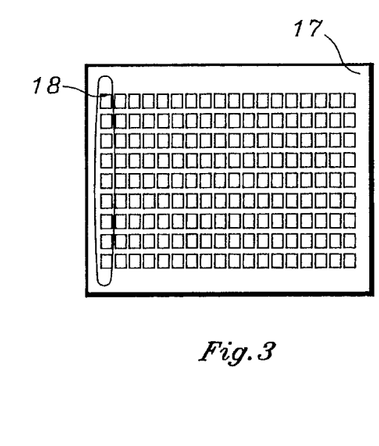
FIG. 3 shows a dot matrix display for displaying the alphanumeric characters and symbols of the system of the invention.

As shown in FIG. 2, the CPU 14 addresses memory 11 over address bus 7 and reads out instructions 12 and encoded character font data 13 over data bus 8 back to the CPU 14. The instruction register and decoder 14a of the CPU 14 decodes the instructions 12 to determine if the character represented by the encoded character font data 13 is to be displayed in a fixed-width format or compressed format. After the encoded character font data 13 is decoded, the control unit 10 sends a control signal over the control bus 9 to enable the I/O device 15 to cause the decoded character font data to be written to the dot matrix display (FIGS. 1b, 3). As shown in FIG. 3, the dot-matrix display 17 consists of a plurality of columns and rows of dots. The leftmost column of dots 18 is defined to be column 1.

The system of the preferred embodiment "generates" two types of character formats for any given font: a fixed-width format in which all characters are five columns wide, and a proportionally-spaced or compressed format in which the width of each character varies according to the number of columns needed to display it. In the preferred embodiment, each columnar portion of a character is represented by one byte of encoded character font data which is stored in a separate memory address in memory 11. However, as can be seen from FIGS. 1b and 4, only five bits of each byte of data are required in the preferred embodiment to fully represent any particular character. Thus for purposes of accurate representation of any particular character, three bits of each byte may be represented by a "don't care" state.

Figure 4:
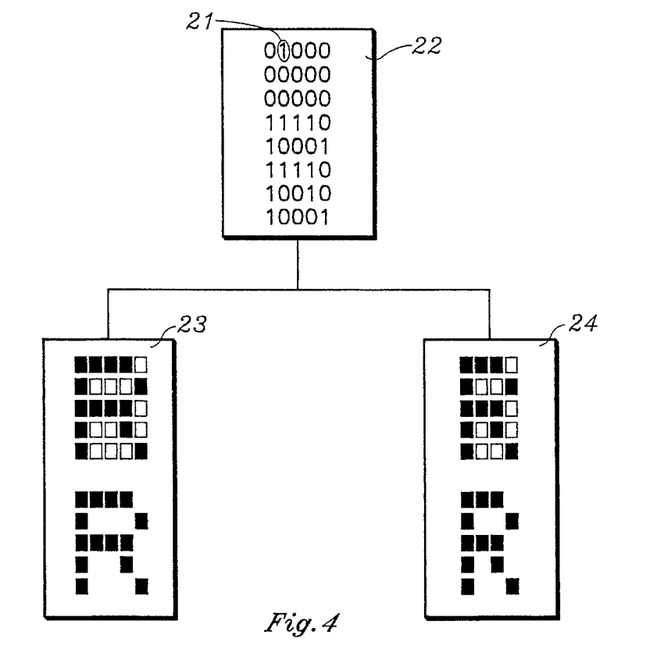
FIG. 4 shows a portion of encoded character font data representing a character stored in the system of the invention, and the alternative display of said character in a fixed-width or compressed format.

For example, FIG. 4 shows the encoded character font data 13 for the letter "R" and further shows the display of said character in both fixed-width format and compressed format; 23 and 24, respectively. As may be seen in the encoded character font data 13 of FIG. 4, a portion of the byte, 22, includes a first set of bits which is a binary representation of the dot configuration for the letter "R" 23 in only the last five bits of data of each column (or byte). The remaining three bits are ignored by the CPU 14 in defining the character which is to be displayed. (In the preferred embodiment, a dot that would appear on the display is represented by a 1 bit; a dot that would not appear on the display is represented by a 0 bit; however, it will be understood that the present invention is not limited as such, and a 0 bit and a 1 bit could be used to indicate that a particular dot is to be activated and not activated, respectively.)

In accordance with the instant invention, the first three bits of each column or byte have been chosen as a second set of bits which indicate whether the corresponding dot column is expendable for generation of compressed characters. In the preferred embodiment, the bit has a bit value of 1 if the column is expendable and 0 if it is not. The character font data 22 include a bit 21 of value 1 in the first bit of the second column or byte, indicating that the second column of dots is expendable for generating a compressed character "R" 24. The first bits of the four remaining columns have a value of 0, indicating that their respective columns of dots are not expendable, and therefore, those columns are to be displayed for the compressed character "R" 24. (Again, in the preferred embodiment, while a 1 and 0 are respectively used to indicate that the column is expendable or not expendable in the forming the compressed character, it will be understood that the present invention is not limited to such a representation.)

Figure 5:
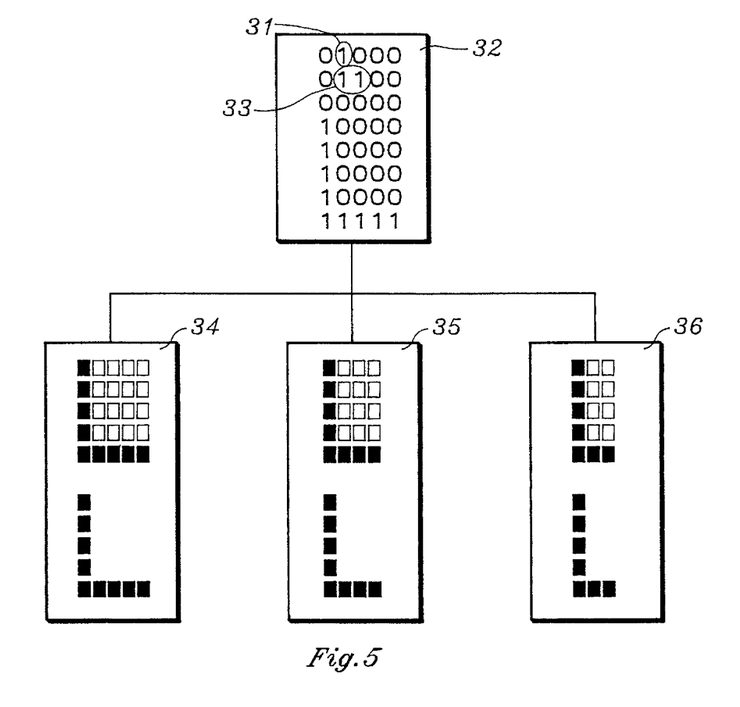
FIG. 5 shows a portion of encoded character font data stored in another embodiment of the system of the invention, and the alternative display of said character in a fixed-width, first- or second-compressed format.

In order to generate the character 34 in a fixed-width format, the system of the present invention ignores the first three bits of each byte of the encoded character font data 32, and enables the I/O device 15 to cause the character font data contained in each memory address for character 34 to be written to the display 17. Thus, in the preferred embodiment of the present invention, the encoded character font data 32 for the character "L" contains a 1 bit (31) in the first bit of the second column and a 1 bit at the second bit of the second and third columns. When the instruction register and decoder 14*a* of the CPU 14 decodes this encoded character font data 32 in accordance with instructions 12 to write a fixed-width character, the CPU 14 will ignore the first three bits of each byte of the encoded character, and the control unit 10 will cause the character font data contained in each memory address to be written over the control bus 9 to the display 17. However if the instructions 12 indicate that a compressed character is to be written, the CPU 14 will compare the first bit of each byte and will determine whether that byte may be expended in the display of the compressed character. If the column may be expended, the data contained in the corresponding memory address will not be written to the display 17, and the instructions 12 will cause the CPU 14 to advance to the next memory address.

FIG. 5 shows another embodiment of the present invention in which two iterations of character compression are completed for generating a compressed character. The character font data 32 is used to generate the letter "L" in its fixed-width form 34 (five columns wide), or either of two compressed character forms, one form 35, four columns wide, and the other form 36, three columns wide. In this embodiment, the first bit in each column of the character font data 32 is used to mark expendable columns for compressed characters as with the previous embodiment. In addition, the second bit in each column or byte of data is used to mark expendable columns if further character compression is desired. Second level character compression is accomplished in the same manner as the first level compression set forth above.

Figure 6:
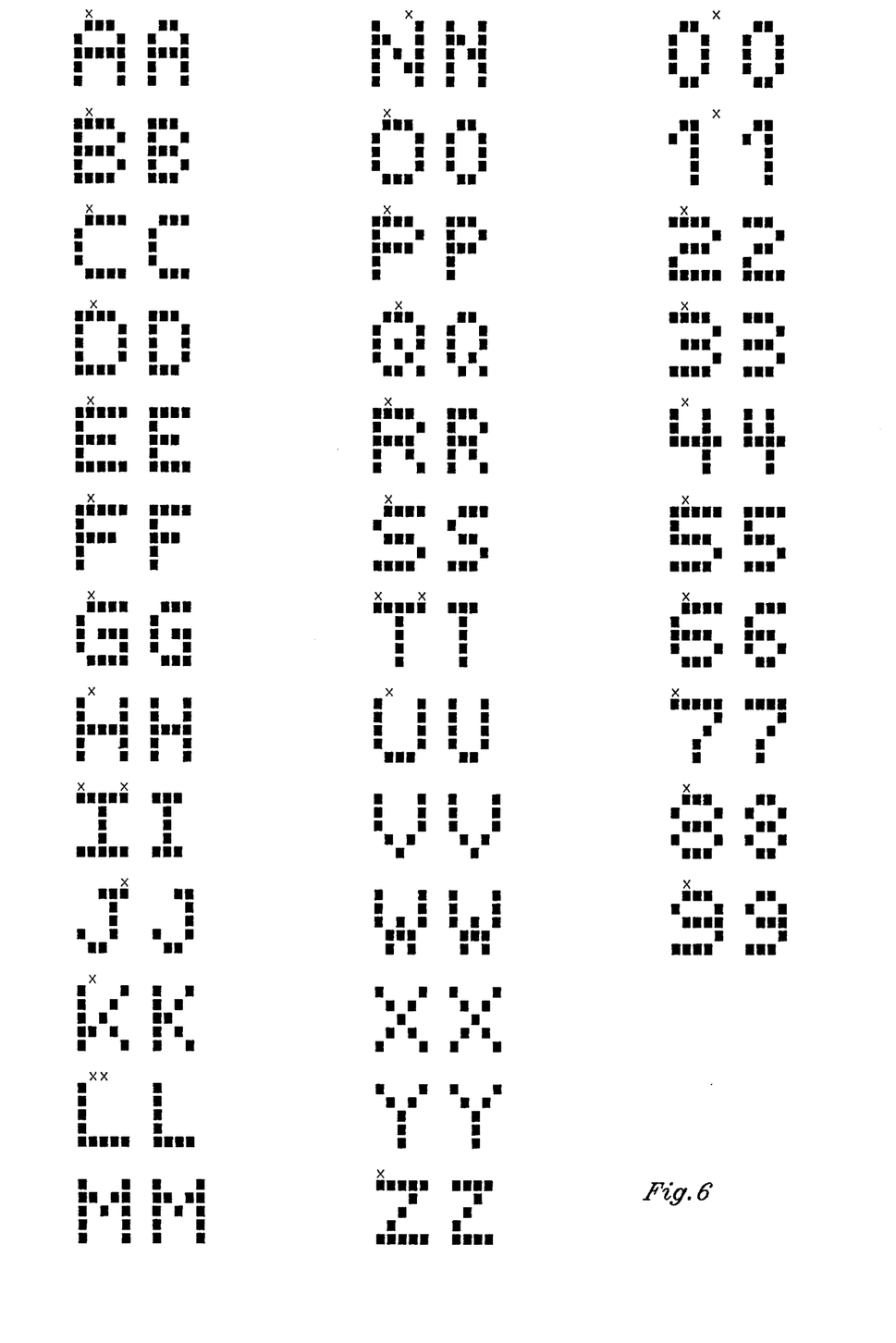
FIG. 6 shows a complete set of fixed-width characters for a particular font, with "X" indicia indicating expendable columns for generation of compressed versions of said characters.

FIG. 6 shows a complete Set of fixed-width alphanumeric characters for a particular font, with "X" indicia above those columns which may be expendable in generating the characters in a compressed format.

The system of the instant invention is particularly adaptable to digital timepieces, because of the limited memory and display space available to such devices. In timepieces, the system of the invention as seen in FIG. 2 generally comprises: the microprocessor portion of a programmable microcomputer (including CPU), the microcomputer generally being in the form of a mask-programmable integrated circuit bonded to a printed circuit board (not shown); and, external (non-CPU) memory, both of which are commonly found in such timepieces. A plurality of manual push button actuators (not shown) are arranged on the outside of the digital timepiece case, and are arranged so as to close spring contacts inside the case, which are in turn electrically connected to the printed circuit board. Operation of the subject system within the timepiece is identical to that discussed above, but, additionally, a timepiece operator may selectively control the display of any particular character in either a fixed-width or compressed version by actuating one or more of the plurality of manual actuators. This operation is discussed in more detail in the following section.

Actuation of an actuator by the timepiece operator closes its corresponding spring contact, which in turn generates a control signal via the I/O device to the CPU portion of the timepiece microprocessor. The control signal generated varies depending upon the manual push button(s) which has been actuated, and thus the version of the character desired for display by the timepiece operator. The CPU receives and processes this signal and then, depending upon the "value" of the control signal, decodes the encoded character font data for either fixed-width or compressed characters. As has been described above, after the encoded character font data is decoded, the control unit of the CPU sends a separate control signal over a control bus to enable the decoded character font data to be written to the timepiece display.

FLOWCHART

Figure 7:
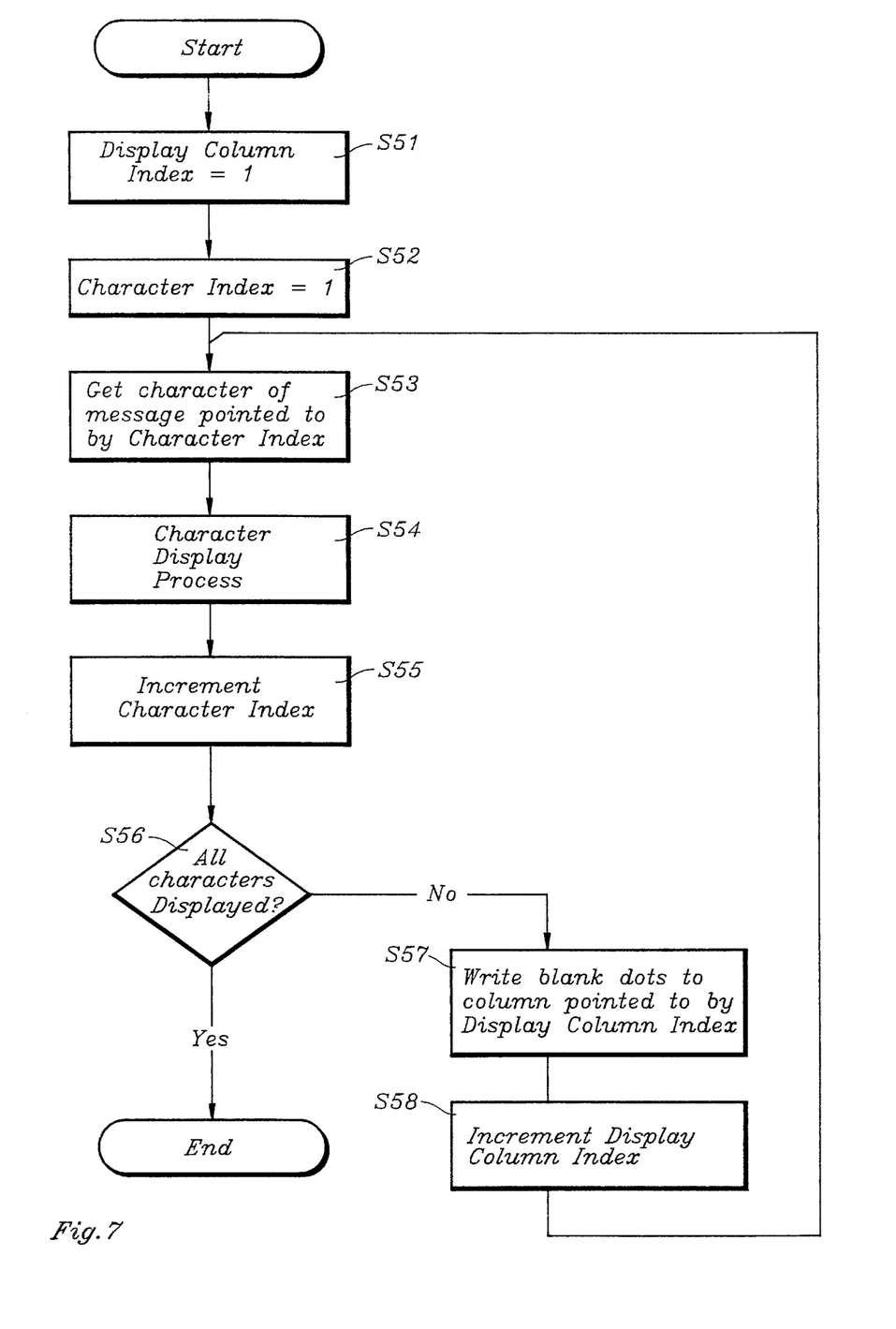
FIG. 7 shows a flowchart of the method of storing and retrieving fixed width and compressed character font data under the preferred embodiment of the instant invention.
Figure 8:
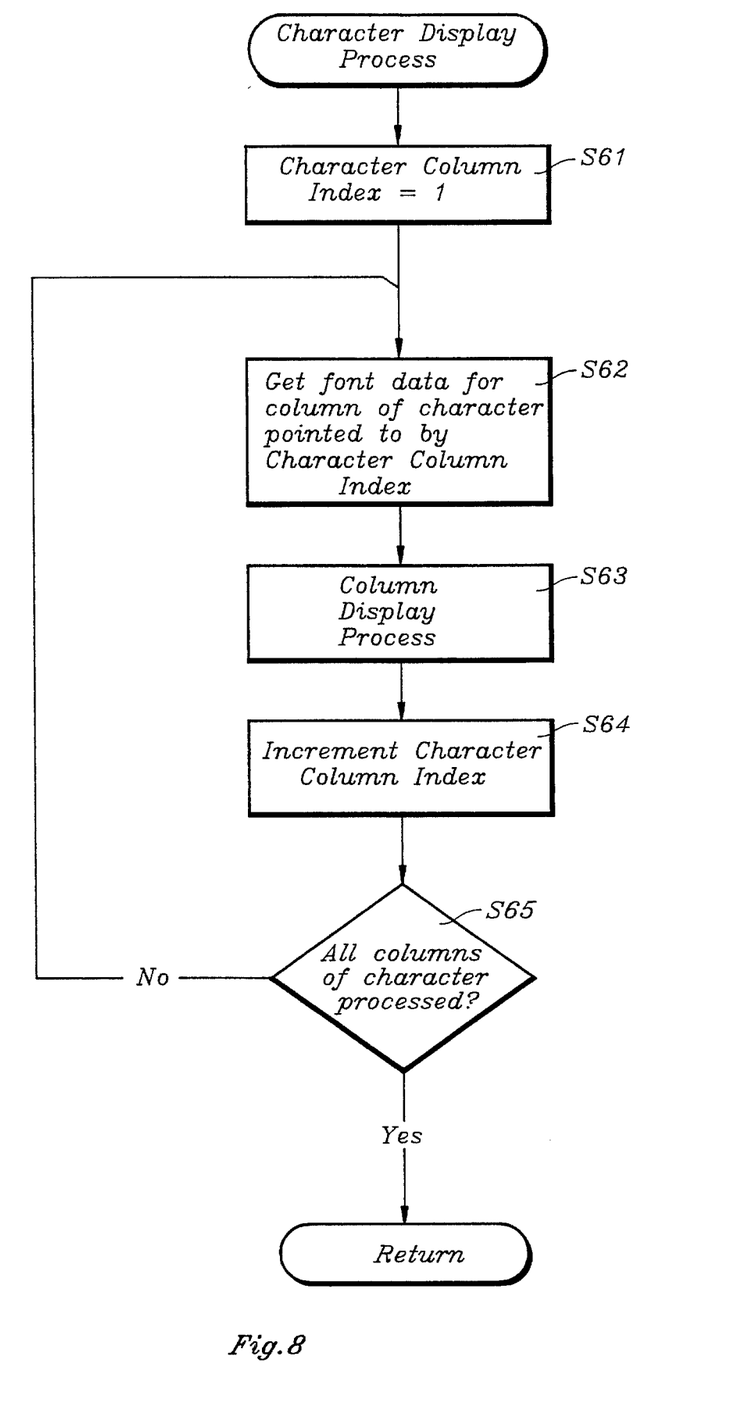
FIG. 8 shows a flowchart of the Character Display process.
Figure 9:
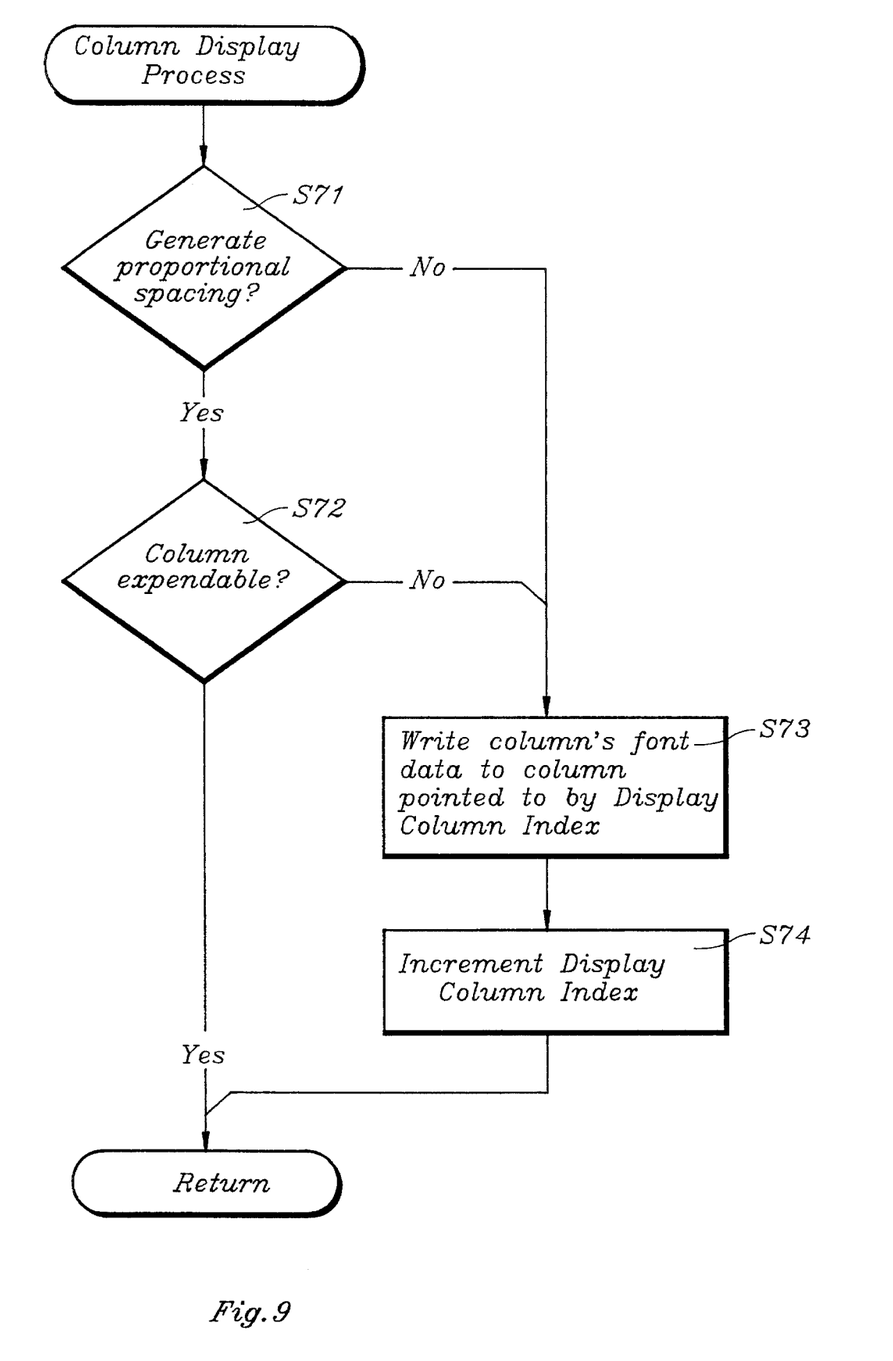
FIG. 9 shows a flowchart of the Column Display process.

FIGS. 7–9 show the sequence of instructions 12 executed by the CPU 14 in order to generate text using either fixed-width or compressed characters on the dot-matrix display 17.

FIG. 7 shows a portion of the computer program used in the instant invention, for displaying a message (that is, some plurality of characters stored sequentially in memory). Execution begins with step 51 in FIG. 7 (hereafter S51). In S51, a designated portion of memory 11 (hereinafter, "variable") named Display Column Index is used to address or "point to" that portion of memory 11 which contains the address of the dot column of the display which is being updated. This variable is initialized to a value of 1 to indicate that column one 18 of the display 17 is to be updated. In S52, a variable named Character Index is used to point to the character in the message which is being displayed. This variable is initialized to a value of 1 to indicate that the first character in the message is to be displayed.

S53 is the first step in a sequence of steps which are repeated for each character in the message. At S53, the character pointed to by the variable Character Index is fetched from program memory 11. In S54, this character is displayed using the Character Display subroutine, which is described in FIG. 8.

The Character Display subroutine begins at S61 with initialization of the variable Character Column Index, which is used to point to the column of the character which is being considered for display. This variable is initialized to a value of 1 to indicate that the first column of the character is to be considered. S62 is the first step in a sequence of steps which are repeated for each column in the character. At S62, the character font data for the column pointed to by the variable Character Column Index are fetched from program memory 11. In S63, the column is displayed using the Column Display subroutine, which is described in FIG. 9.

The Column Display subroutine begins at S71 where it is determined whether or not fixed-width or compressed characters are to be generated (i.e., whether the characters are to be generated in fixed-width or compressed format). If compressed characters are to be generated, then the dot column data must be examined at S72 to determine whether or not the column being considered is expendable. If it is, execution returns to S64 with the column not displayed. Otherwise, if fixed-width characters are to be generated or the column is not expendable, the column's dot data are written to the display at the column pointed to by the variable Display Column Index, in S73. Next, the variable Display Column Index is incremented in S74 to point to the next column of the display. Execution then returns to S64 with the column displayed. If there are no more columns to consider, as determined at S65, display of the character is complete and execution returns to S55. Otherwise, execution proceeds with S62, and all remaining columns are processed for display prior to returning to S55. With the current character displayed, the variable Character Index is incremented in S55 to point to the next character in the message.

If there are no more characters to display, as determined at S56, display of the message is complete and execution ends. Otherwise, a blank dot column is written to the dot matrix display after the character at S57, and the variable Display Column Index is incremented to point to the display location of the next character in the message, in S58. Execution then proceeds with S53 where the next character in the message is fetched from program memory 11.

While the invention has been particularly shown and described with reference to a preferred embodiment, it will be understood by those skilled in the art that various other changes in form and detail may be made without departing from the spirit and scope of the invention. For example, the invention may be applied to various fonts and data formats of differing typefaces, weights, sizes, postures, and configurations. In addition, the selection of bit values and locations in the character font data is merely exemplary and not intended as a limitation of the invention described herein.

What is claimed is:

1. A system for storing, retrieving and displaying a character, where the character is to be displayed in either a compressed character display format or a fixed-width character display format, which comprises:

memory means for storing the character as an encoded font data, the encoded font data comprising a plurality of bytes;

each byte of the encoded font data comprising a first set and a second set where each set comprises at least one bit, the collective first sets for the plurality of bytes representing both a fixed-width character and a compressed character, and the second set indicating whether the corresponding first set of the byte should be displayed when the system is in the compressed character display format; and means responsive to a control signal for causing the character to be displayed on a display, a first value for the control signal causing the character to be displayed in the fixed-width character display format and a second value for the control signal causing the character to be displayed in the compressed character display format.

2. The system according to claim 1, wherein the display is a dot matrix display.

3. The system according to claim 1, wherein the means responsive to the control signal includes decoding means for decoding the encoded font data.

4. The system according to claim 1, which further comprises actuating means coupled to the means responsive to the control signal, the actuating means generating the control signal.

5. A system for storing, retrieving and displaying a character, where the character is to be displayed in either a compressed character display format or a fixed-width character display format, which comprises:

memory means for storing the character as an encoded font data, the encoded font data comprising a plurality of bytes;

each byte of the encoded font data comprising a first and a second set of bits, the collective first sets for the plurality of bytes representing both a fixed-width character and a compressed character, and the second set serving as a flag to indicate whether the corresponding first set of the byte should be displayed when the system is in the compressed character display format;

a display;

an actuator generating a control signal having a first and a second value; and means responsive to the control signal for causing the character to be displayed on the display, the first value for the control signal causing all the first sets for the plurality of bytes to be displayed, and the second value for the control signal causing each first set of the byte having the second set indicating that the first set should be displayed when the system is in the compressed character display format to be displayed.

6. The system according to claim 5, wherein the display is a dot matrix display.

7. The system according to claim 5, wherein the means responsive to the control signal includes decoding means for decoding the encoded font data.

8. The system according to claim 5, wherein the system is contained within a digital timepiece.

9. The system according to claim 8, wherein the actuator is a push button.

10. A method for storing, retrieving and displaying a character in a system, where the character is to be displayed in either a compressed character display format or a fixed-width character display format, comprising the steps of:

storing the character in memory as an encoded font data, the encoded font data comprising a plurality of bytes;

formatting each byte of the encoded font data to comprise a first set and a second set where each set comprises at least one bit, the collective first sets for the plurality of bytes representing both a fixed-width character and a compressed character, and the second set indicating whether the corresponding first set of the byte should be displayed when the system is in the compressed character display format; and providing to the system a control signal having a first and a second value, the first value causing all the first sets for the plurality of bytes to be displayed on a display and the second value causing each first set of the byte having the second set indicating that the first set should be displayed when the system is in the compressed character display format to be displayed on the display.

* * * * *